April 12, 1938. F. KAMANN 2,114,144
GAS PRODUCING APPARATUS
Filed Feb. 20, 1936
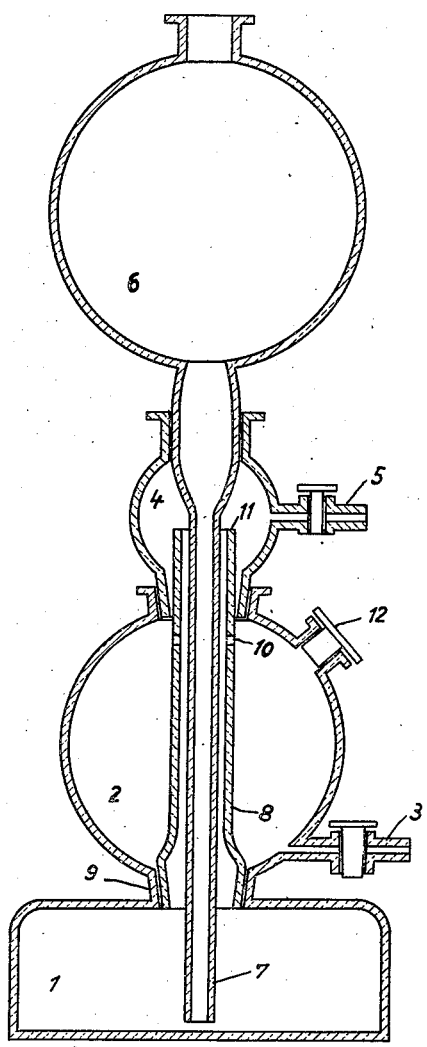
Inventor:
Franz Kamann Patented Apr. 12, 1938

2,114,144

UNITED STATES PATENT OFFICE 2,114,144

GAS-PRODUCING APPARATUS

Franz Kamann, Essen, Germany, assignor to Robert Muller, Essen, Germany

Application February 20, 1936, Serial No. 64,874
In Germany August 1, 1934

2 Claims. (Cl. 23—282)

Gas-producing apparatus of the "Kipp" construction has the disadvantage that, when the gas producing operation is stopped the decomposed products mix with fresh acid or the like and soon render it useless. The present invention overcomes this drawback by an arrangement which prevents the mixing of the decomposed products with fresh acid.

The drawings show a diagrammatic side view of a construction in accordance with the invention.

The acid container 1 and the gas-producing vessel 2 are made of one piece of glass, the latter having an outlet tap 3 and a filling aperture or plug 12. The gas container 4 is disposed airtight in the container 2, and provided with outlet tap 5 for the gas produced. The acid supply container 6 is inserted airtight into the vessel 4 and its tube 7 reaches close to the bottom of the container 1. Round the tube 7 and fitted airtight between the neck of the vessels 1 and 2 is a raising tube 8 which is provided with several openings 10 near the upper end of the vessel 2 or in the container 4. It, however, is not absolutely necessary, to provide said openings 10. In this case the acid rises over the upper edge 11 of the tube 8. The arrangement of the vessel 4 enables the tube 8 to reach above the upper edge or neck of the container 2 and can therefore be easily inserted in the neck 9 between the containers 1 and 2.

The substance to be decomposed is provided in the vessel 2 and acid or the like is filled into the containers 1 and 6. When the tap 5 is open the acid rises in the tube 8 and flows through the openings 10 onto the material. When the tap 5 is closed the excess pressure formed in the vessels 2 and 4 forces back the acid located in the tube 8. The acid used remains in the container 2 and therefore cannot mix with fresh acid.

It, however, has already been proposed to insert a tube airtight into the neck between the acid container and the gas-producing vessel. Said tube, however, is provided with openings just above the neck so that the above mentioned drawback still exists.

I claim:

1. In a gas producing apparatus of the class described, an acid container, a gas producing vessel arranged above same, a connecting neck between them, a raising-tube detachably inserted, at its lower end, into the neck, said tube opening at the lower end into the container and separating the lower part of the vessel from the container, an upper acid container having a tube reaching close to the bottom of the lower container and passing through said raising-tube, and a gas container opening into the gas producing vessel and being provided with an outlet tap, said raising-tube having openings situated near the upper part of the vessel adapted to lead the acid in a system of radiating lines from above into the vessel.

2. In a gas producing apparatus of the class described, an acid container, a gas producing vessel arranged above same, a connecting neck between them, a raising-tube detachably inserted, at its lower end, into the neck, said tube opening at the lower end into the container and separating the lower part of the vessel from the container, an upper acid container having a tube reaching close to the bottom of the lower container and passing through said raising-tube, and a gas container opening into the gas producing vessel and inserted into the upper opening of same, said tube of the upper acid container being fitted gas-tight in the upper part of the gas container, the latter being provided with an outlet tap, said raising-tube having openings situated near the upper part of the vessel adapted to lead the acid in a system of radiating lines from above into the vessel.

FRANZ KAMANN.